United States Patent [19]

Lechleider

[11] Patent Number: 5,426,668
[45] Date of Patent: Jun. 20, 1995

[54] TETHERLESS ACCESS TO COMMUNICATION NETWORKS

[75] Inventor: Joseph W. Lechleider, Mendham Township, Morris County, N.J.

[73] Assignee: Bell Communications Research, Inc., Livingston, N.J.

[21] Appl. No.: 182,320

[22] Filed: Jan. 12, 1994

[51] Int. Cl.$^6$ .............................................. H04L 7/02
[52] U.S. Cl. .................................... 375/267; 375/347; 375/348; 455/52.1
[58] Field of Search ................... 375/40, 100, 101, 58, 375/60; 455/33.1, 49.1, 50.1, 52.1, 43, 54.1, 132

[56] References Cited

U.S. PATENT DOCUMENTS

| | | | |
|---|---|---|---|
| 4,519,084 | 5/1985 | Langseth | 375/14 |
| 5,170,413 | 12/1992 | Hess et al. | 375/40 |
| 5,253,270 | 10/1993 | Petit | 375/61 |
| 5,289,499 | 2/1994 | Weerackody | 375/100 |
| 5,297,168 | 3/1994 | Sant'Agostino et al. | 375/40 |
| 5,305,353 | 4/1994 | Weerackody | 375/40 |

OTHER PUBLICATIONS

J. H. Winters, "Optimum Combining in Digital Mobile Radio with Cochannel Interference," *IEEE Journal on Selected Areas in Communications*, 1984, vol. SAC-2, pp. 528–539.

J. H. Winters, "Optimum Combining in Digital Mobile Radio with Cochannel Interference," *IEEE Transactions on Vehicular Technology*, 1984, vol. VT-33, pp. 144–155.

A. S. Acampora et al., "A Wireless Network for Wide-Band Indoor Communications," *IEEE Journal on Selected Areas in Communications*, 1987, vol. SAC-5, pp. 796–805.

R. C. Bernhardt, "Macroscopic Diversity in Frequency Reuse Radio Systems," *IEEE journal on Selected Areas in Communications*, 1987, vol. SAC-5, pp. 862–870.

J. M. Holtzman et al., "Rayleigh Fading Effect Reduction with Wideband DS/CDMA Signals," *Proceedings IEEE Globecom '91 Conference*, 1991, paper 16.7, pp. 0553–0557.

M. L. Honig et al., "Spread-Time Code Division Multiple Access," *Proceedings of the IEEE Globecom '91 Conference*, paper 25A.1.1, pp. 0836–0840.

J. W. Lechleider, "A Generic Model for Tetherless Access to the Telephone Network," *Proceedings of the IEEE Globecom '92 Conference*, pp. 98–103.

Primary Examiner—Stephen Chin
Assistant Examiner—T. Ghebretinsae
Attorney, Agent, or Firm—Leonard Charles Suchyta; James W. Falk

[57] ABSTRACT

A communication system for coordinated downstream diversity transmission includes a central processing center for selecting adaptive transmitter parameters and adaptive receiver parameters to as to optimize an estimate of a transmitted data symbol received by a given mobile unit while constraining power output as well as accounting for interference to other mobile units within the propagation range of base units controlled by the central processing center. The adaptive transmitter and receiver parameters are determined from the solution of an eigenvalue formulation expressed in terms of the transmission path characteristics between the mobile unit and the base unit as well as transmission signal sources and mobile unit processing filters.

13 Claims, 5 Drawing Sheets

FIG. 5
MOBILE UNIT 500

TETHERLESS ACCESS TO COMMUNICATION NETWORKS

FIELD OF THE INVENTION

This invention relates generally to communication systems and, more specifically, to the coordinated transmission of information over diverse propagation paths.

BACKGROUND OF THE INVENTION

A conventional cellular mobile/radio system is composed of numerous mobile units (MUs), such as handsets operated by individual users, which home-on associated base stations or base units (BUs). A single base station serves a number of mobile units that lie within a simply connected geographical area—a cell—identified to that single base unit.

Most of the current cellular systems use a registration method to keep track of the locations of the mobile units. A specific database serves as a controller for the units within an assigned cell. Each mobile unit is required to inform, that is, register with the base station, its location when the user moves from the original cell into a new cell. This registration process is typically accomplished automatically by the mobile unit, but the registration may also be effected manually by the user of the mobile unit. The base station will, in turn, pass the registration to the serving switching office.

Since a conventional cellular mobile system generally covers a geographical area larger than a single switching office, the registration process requires the coordination among a plurality of switching offices, and such registration process may involve the use of centralized databases in the serving area to keep track of mobile locations.

When multiple switching offices are involved, the handoff process to maintain an established call as the user moves from one cell (original) to another cell (secondary), becomes somewhat complicated. To ensure a smooth and interrupt-free handoff, two parallel communication paths must be set-up between the mobile unit and original and secondary base stations serving the original cell and secondary cell, respectively. These two communication paths must be merged in the associated switching offices until the original base station breaks its communication path with the mobile unit. Current cellular mobile systems use complex and cumbersome procedures to handle such handoffs; in practice, dedicated signaling and switching procedures are required to handle such handoffs in order to allow movement from one cell to another, that is, one base station to another when the base stations are connected to different switching offices.

Cellular systems separate potentially interfering systems by assigning each MU to a specific BU. Co-channel interference is avoided by not assigning the same channel frequencies in contiguous cells. The cellular approach thus discards co-channel interference information even though it might be used to increase the capacity of the system or improve system performance. Potential interference is information about a signal that might be exploited by suitable signal processing.

The approach in accordance with the present inventive subject matter discloses how MUs may, most effectively, interact with more than one BU using a generalized diversity technique. The disclosed approach represents a substantive improvement to prior art diversity techniques. Representative of one conventional approach is the material on optimal combining as set forth in the articles "Optimum Combining in Digital Mobile Radio with Co-channel Interference," IEEE Journal on Selected Areas in Communications, vol. SAC-2, pp 528–539, July 1984, and "Optimum Combining in Digital Mobile Radio with Co-channel Interference," IEEE Transactions on Vehicular Technology, vol. VT-33, pp 144–155, August 1984, both by J. H. Winters. The present generalized approach also is an enhancement to another conventional avenue of approach related to resource sharing that is discussed by A. S. Acampora and J. H. Winters in the publication "A Wireless Network for Wide-band Indoor Communications," IEEE Journal of Selected Areas in Communications, vol. SAC-5, no. 5, pp 796–805, June 1987. Another conventional avenue of approach is "macro-diversity," which uses geographically dispersed antennas; the paper entitled "Macroscopic Diversity in Frequency Reuse Radio Systems," IEEE Journal on Selected Areas in Communications, vol. SAC-5, no. 5, pp 862–870, June 1987, published by R. Bernhardt, is exemplary of this procedure. In Bernhardt's paper, a downstream transmitter provides diversity that can be exploited to optimize transmission performance while controlling interference to other MUs. This is done by pre-conditioning the signals transmitted to the several MUs in a centralized processing system that performs all signal pre-processing, switching, control, signaling, location database updates and maintenance functions. This centralized processor may be referred to as the Signal Processing and Switching Center (SPSC); the SPSC might be co-located with a telephone switching center. As alluded to above, however, such an approach can be complicated and cumbersome.

In addition to the advantages accruing from more sophisticated signal processing, using several BUs to serve each MU also provides advantages that normally accrue from diversity, that is, using several different channels for transmission provides a greater statistical robustness to fading than a single channel can provide. This effect can also be obtained in other ways such as frequency diversity in spread spectrum signaling, as described by J. Holtzman, "Rayleigh Fading Effect Reduction with Wide-band DS/CDMA Signals," Proceedings IEEE Globecom '91 Conference, paper 16.7, or by using time diversity in coding or time-spreading, as described by M. L. Honig, et al., "Spread-time Code Division Multiple Access," Proc. IEEE Globecom '91 Conference, paper 25A. 1. However, these systems consume measurable channel capacity to achieve diversity.

One of the constraints with the cellular approach is that the capacity of the system is bounded once the available bandwidth has been fixed. One way to increase this capacity is to reduce cell sizes and, concomitantly, transmitted power so that the generic cellular architecture can be reapplied but on a somewhat smaller (microcell) scale. This implies that the same engineering, system planning and coordination between micro-cells must be conducted as in the original cellular system, but on a more complex scale. Furthermore, the reduction of the distance to cell boundaries leads to more microcell boundary crossings with concomitant increases in switching, signaling, and location database activities related to increased handoff rates.

Many of the foregoing shortcomings and limitations were addressed in a paper entitled "A Generic Model for Tetherless Access to the Telephone Network,"

authored by J. W. Lechleider (the present inventor) and published in the Proc. IEEE Globecom '92 Conference. In this paper, generic models of radio access between base units and mobile units were developed and used to determine optimum combinations of transmitter and receiver vectors for transmission from the base units to the mobile units (downstream) as well as transmission from the mobile units to the base units (upstream). The optimum vectors were determined under the presumption that the receiver was arranged with preliminary equalization to eliminate interference between different vectors in the same sequence of data emitted by a given base unit (so-called vector intersymbol interference). With this presumption, it was only necessary to optimize the "one-shot" transmission path or channel that results from transmitting a single vector. Moreover, the criterion used for optimization was to maximize the received signal to mean-square error ratio at the signal receiver portion of the mobile unit. Because the maximum value could be made as large as desired merely by increasing the transmitted power, the transmitted power is constrained in the optimization procedure. This optimization procedure, however, fails to take into account interference that might be caused at the receivers of other mobile units within the range of the base units used to transmit the signal vector to the given mobile unit. Any transmission schema, to be especially effective in more practical applications, must consider the interference cause in other mobile units.

A relatively new technology closely related to the cellular mobile systems is PCS—Portable Communication System; in this technology field, base units communicate with mobile units operated by PCS users or "rovers". One solution proposed to accommodate a high density of PCS users/rovers is to arrange microcells in substantially the same manner that they are used in mobile radio systems. Thus, each base unit has a geographical area assigned to it in the sense that all PCS users in the geographical area would be served by the base unit in that area. There are many concerns with such an approach, not the least of which is the level of switching activity and location database updates that would be required. In addition, it is anticipated that frequency re-use might be more constrained than it is in mobile radio systems. Based on the teachings of the prior art in the field of cellular mobile systems, an alternative to the one base unit per cell arrangement might be to use multiple base units in a cell that is somewhat larger than the anticipated microcells and to use diversity transmission techniques downstream and diversity reception upstream. Linear diversity systems might thus be employed to replace the space division multiplexing in microcell systems with what might be called diversity division multiplexing.

By way of terminology in what follows, the term base unit is used as a universal descriptor to cover both the PCS and the cellular environments, whereas the term mobile unit is used as universal descriptor to cover both the PCS and cellular environments. In general, a BU includes a transmitter for downstream transmission and a receiver for upstream reception. Also, a MU also includes a receiver for downstream reception and a transmitter for upstream transmission. The description sets forth the context of the transmission, that is, whether downstream or upstream, so the particular transmitter or the particular receiver being considered will be clear from the context.

SUMMARY OF THE INVENTION

These shortcomings and other deficiencies and limitations are obviated in accordance with the present invention by configuring a system with more than one base unit per cell and by arranging the system so that each mobile unit receives coordinated transmissions over a plurality of channels from all base units in the cell. The system thus provides linear transmitter diversity downstream.

Broadly, the system is an arrangement wherein the combination of base units propagating the coordinated signals and of mobile units with adaptive receiver characteristics is selected to maximize the mean-square signal to mean-square interference and noise ratio in each mobile unit while constraining the interference caused by the transmitted signal detected by other mobile units. In particular, an array of pre-conditioned signals is provided by the base stations to maximize the signal-to-interference ratio (SIR) at a given mobile unit's receiver output while constraining power as well as the total interference caused in the other mobile units.

In accordance with a preferred method aspect of the present invention, the method for transmitting a data symbol to a given mobile unit utilizes a plurality of base units, wherein each base unit is arranged to generate a transmission signal effective for radio frequency propagation. The data symbol is weighted with adaptive transmission parameters to produce a weighted symbol for each base unit and, in turn, the transmission signal for each base unit is weighted with the corresponding weighted symbol to produce a weighted transmission signal. Each weighted transmission signal is propagated in the downstream direction by its corresponding base unit. The mobile unit destined to receive the data symbol detects a composite transmission signal which is the superposition of each weighted transmission signal propagated by each base unit. The composite signal is processed with adaptive receiver parameters to produce an estimate of the data symbol; the number of adaptive receiver parameters corresponds to the number of adaptive transmission parameters. The adaptive transmission parameters and the adaptive receiver parameters are determined so as to optimize the estimate of the data symbol in the given mobile unit while constraining power as well as accounting for interference to other mobile units within the propagation range of the base units due to each weighted transmission signal.

A feature of the present invention is that the system described herein may be used in conjunction with (concatenated with) other diversity techniques. To do this, it is only necessary to treat each carrier frequency, time slot, and so forth as a separate "logical" base unit and apply the method described.

Yet another feature is that the system also facilitates the addition of base units to the system with most of the ancillary system planning and engineering replaced by increasing signal processing capability. Furthermore, the handoff activity would be replaced by signal processing. Because of this, adding temporary and/or portable base units is straightforward.

DETAILED DESCRIPTION

OVERVIEW

The focus of this detailed description is on the transmission characteristics for communicating from base units to mobile units (downstream transmission). The general solution to the upstream transmission given a power constraint on the output of the mobile unit has already been formulated and the solution outlined in the paper "A Generic Model for Tetherless Access to the Telephone System" (referred to hereinafter as the Lechleider paper) as discussed in the Background Section. The teachings of the Lechleider paper are incorporated herein by reference; these teachings describe the general environment for tetherless access as well as related terminology and notation.

Using multiple diversity techniques to provide network access to several users homing on several base units is first described by providing a motivating example of a two base unit-two mobile unit system so as to introduce multiple diversity at a most fundamental level. This fundamental level is presented for Pulse Amplitude Modulation (PAM), and includes channel dispersion and the differences in delay between base unit-mobile unit transceiver pairs. Moreover, the general case of T base units and R mobile units is readily deduced from this specific case. Thus, with T base units it is possible to simultaneously transmit signal arrays whose parameters are coordinated to eliminate any appreciable signal interference at any $(R-1)$ mobile units while still providing the desired signal at the Rth user's receiver. In fact, T different such coordinated transmissions are effected to transmit to the R different users without perceptible interference. Thus, complicated database manipulation procedures in conventional systems are replaced by multiplexing and more sophisticated signal processing. This tradeoff is crucial because the relative costs of digital signal processing is rapidly decreasing and is therefore cost effective relative to the complicated database processing.

GENERAL SYSTEM DESCRIPTION

Figure 1:
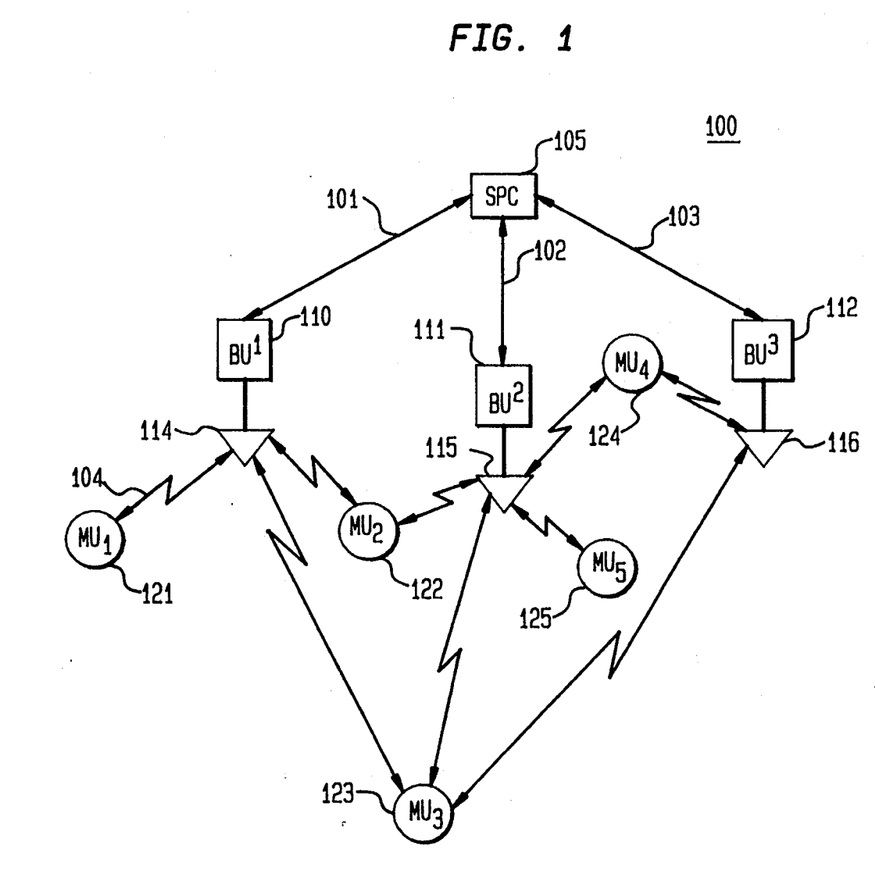
FIG. 1 is a general block diagram of the general diversity system in accordance with the present invention.

In the system 100 under consideration as shown in FIG. 1, all base units 110, 111, and 112, having associated antennas 114, 115, and 116, respectively, are connected to Signal Processing Center (SPC) 105 via land links 101-103, respectively. (The Signal Processing Center replaces the Signal Processing and Switching Center alluded to in the Background Section since switching is no longer a primary function required for the present invention, and the SPC terminology emphasizes this fact.) Each mobile unit 121-125 can communicate with the several base units as illustrated in FIG. 1 via radio links. A typical radio link is link 104 coupling $BU^1$ with $MU_1$. Moreover, different mobile units may communicate with different subsets of base units even though they might have some base units in common. Thus, for example, only $MU_3$ (123) communicates with all three BUs in FIG. 1, while $MU_4$ (124) communicates with $BU^2$ and $BU^3$ (111 and 112). (With respect to notation, base units and quantities associated with them are identified by superscripts, while mobile units and their associated quantities are identified by subscripts.)

In transmitting downstream, each involved BU sends out a signal that is combined at the intended MU with signals sent by other BUs. Thus, signals sent by $BU^1$ and $BU^2$ are superposed at $MU_2$, which processes the combined received signal. The signals transmitted by $BU^1$ and $BU^2$ that are intended for $MU_2$ may also affect $MU_1$ in the form of an interfering signal. As shown later, the level of this effect depends on the characteristics of the signals used to communicate with $MU_2$ and on the characteristics of the receiver at $MU_1$. Thus, the choice of the characteristics of the receivers, other than the one being communicated with, will affect the design of the optimum transmitted signals.

The SPC 105 includes a computer (not shown) that computes the signals that are sent by each base unit to each of the mobile units that it serves. The signals that are intended for the many MUs that are served by the base unit are analytically superposed in the SPC before the transmitted signal constellation is emitted by the antennas 114, 115, or 116. Thus, each BU simultaneously transmits signals to all of the MUs that it serves. (Also, SPC 105 processes all of the upstream signals that are received by the various BUs in a coordinated way. In this way, signals from different MUs are separated.)

The signals to be transmitted by any BU are expressed as a vector in a finite dimensional vector space. These vectors may have many realizations. For instance, they may be a finite sequence of pulses with the heights of the pulses being the components of the vector. Multitone signals can also be used with the amplitudes of the individual tones being the vector components. Also, a collection of code-words modulating a noise-like carrier as in CDMA can be used, but with code words modulated by vector component values. Thus, the total signal transmitted downstream is a collection of finite dimensional vectors. Each of the constituent vectors traverses a different path to the MU that it is intended for, thereby providing transmission diversity.

DESCRIPTION OF TRANSMISSION CHARACTERISTICS

An explanation for a single downstream transmission ("one-shot" transmission) is presented since it is presumed that each mobile unit's receiver has standard equalization to eliminate interference between successive vectors; such equalization is achieved with a straightforward generalization of a conventional decision feedback equalizer (DFE). Since each transmitted data symbol is a vector, transmission will be represented by a matrix. The transmission matrix might not be square because the space of received signals might be different than the space of transmitted signals. This would be the case, for example, if the MU used an oversampling A/D converter or fractionally spaced equalization. Sometimes a different norm in the two spaces is also appropriate. In addition to the potential difference in transmit and receive spaces, there will also be a difference in the form of channels associated with different MUs. One reason for this is that some MUs will be located near the base unit so that there is little signal dispersion because of transmission while others may be far away and partially blocked so that multipath transmission effects are more evident. Another reason for differences between MUs might be difference in services used. One user may require high fidelity voice transmission while another requires lower speed data transmission.

The receiver at each mobile unit is assumed to be linear, i.e., it forms an inner product of the vector representing the received signal with a vector representing the receiver characteristic.

TWO BASE UNIT, TWO MOBILE UNIT SYSTEM

Figure 2:
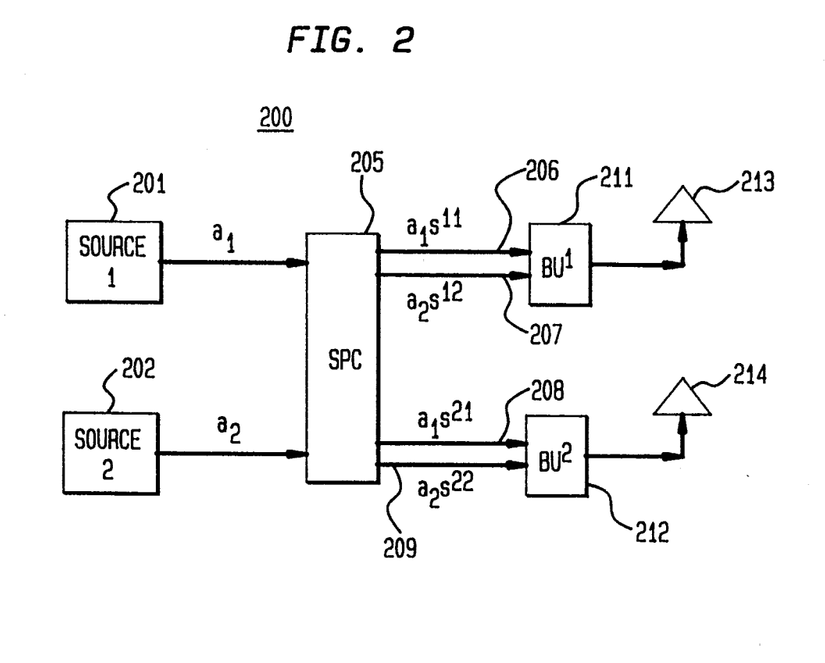
FIG. 2 is a high-level block diagram of an arrangement to propagate downstream diversity signals for a two base station system.

Coordinated downstream transmission of data from independent data sources 201 and 202 is illustrated in high-level block diagram form 200 in FIG. 2. In accordance with the transmission aspect of the present invention for this special case, SPC 205 receives as inputs the data streams as provided by independent data sources 201 and 202. SPC 205, presumed to be operating in its data transmission mode (as distinct from its start-up or initialization mode wherein no data transmission of actual data occurs), provides coordinated signals related to data $a_1$ emitted by data source 201 over leads 206 and 208 to base units 211 and 212, respectively. The data associated with $a_1$ appearing on leads 206 and 208 are appropriately weighted by so-called base unit transmission parameters designated $s^{11}$ and $s^{21}$; the manner of determining these parameters is set forth in detail later. Similarly, SPC 205 provides coordinated signals related to data $a_2$ emitted by data source 202 over leads 207 and 209 to base units 211 and 212, respectively. The data associated with $a_2$ appearing on leads 207 and 209 are appropriately weighted by base unit transmission parameters designated $s^{12}$ and $s^{22}$. Base unit 211 includes an appropriate signal constellation selected to efficiently propagate radio frequency (RF) signals from antenna 213. The weighted signals $a_1s^{11}$ and $a_2s^{12}$ are associated with the signal constellation in base unit 211 and then propagated by antenna 213. Similarly, base unit 212 includes another signal constellation selected to efficiently propagate RF signals from antenna 214. The weighted signals $a_1s^{21}$ and $a_2s^{22}$ are associated with the signal constellation in base unit 212 and then propagated by antenna 214.

Figure 3:
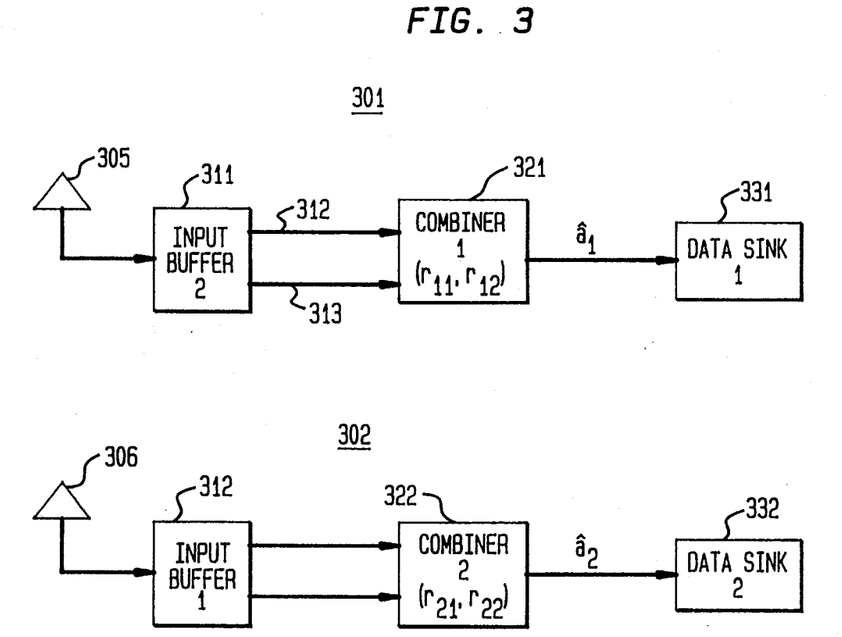
FIG. 3 is a high-level block diagram for a pair of mobile units arranged to receive downstream diversity signals.

Downstream from the RF propagation are mobile units, such as mobile units 301 and 302 illustrated in FIG. 3. Each mobile unit is independent of the other unit, but the operations accomplished by each mobile unit are essentially the same—thus only unit 301 is described since unit 302 is commensurate with unit 301. The RF signal is detected by antenna 305, and this signal in turn feeds input buffer 311. Buffer 311 is composed of two independent processing paths having characteristics matched to the transmission constellation of the base units to which mobile unit 301 corresponds; this correspondence will also be discussed in detail shortly. The incoming signal from antenna 305 is separated into two signals appearing on leads 312 and 313, respectively. Leads 312 and 313 serve as inputs to combiner 321. Combiner 321 samples and then processes the incoming signals with so-called mobile unit receiver parameters, shown as $r_{11}$ and $r_{12}$, to obtain an estimate, designated $a_1$, of the desired data $a_1$; the manner of selecting these receiver parameters is presented in the sequel. The estimate $a_1$ is provided to data sink 331 as representative of the expected data $a_1$.

Figure 4:
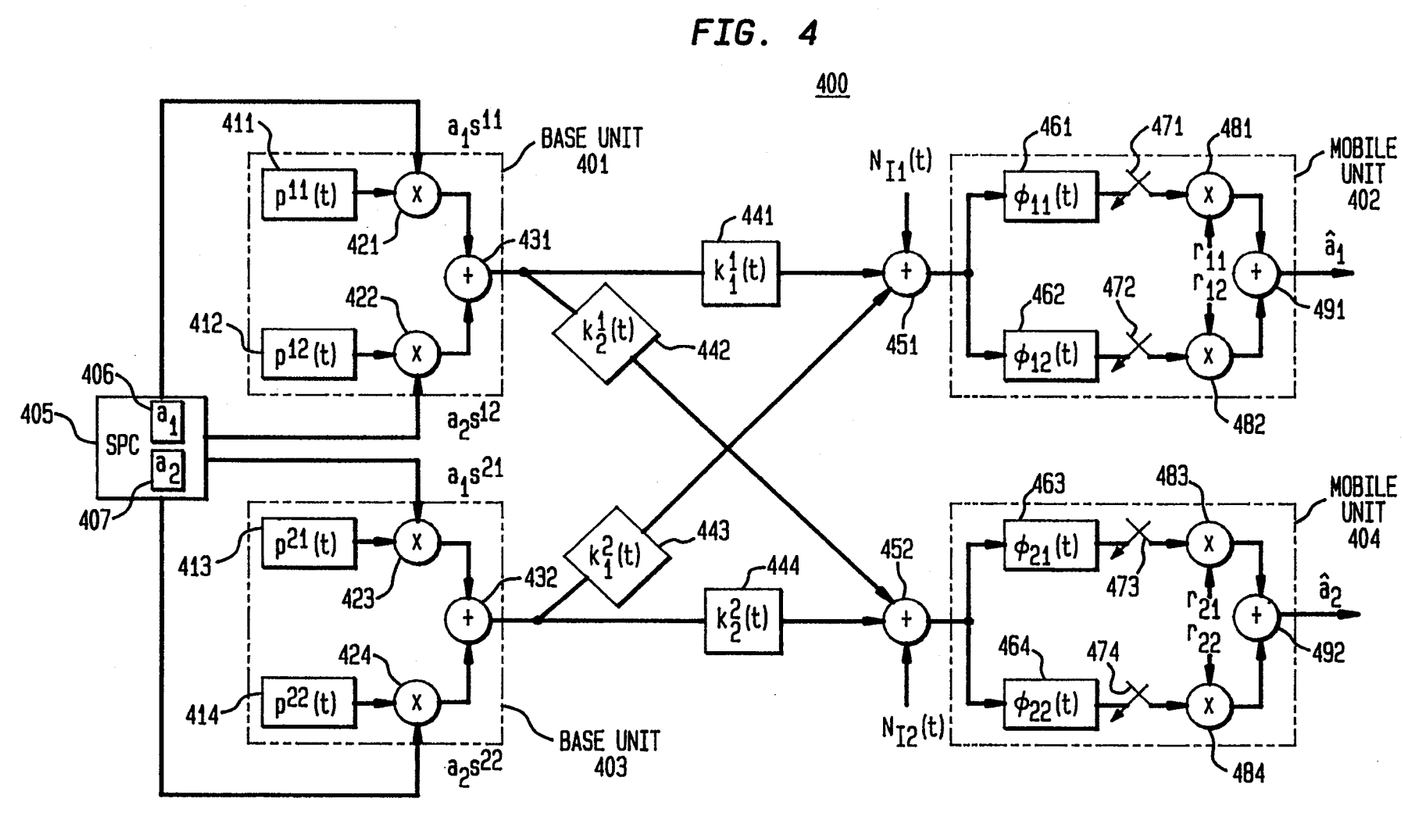
FIG. 4 is a general block diagram of a two base unit-two mobile unit downstream diversity transmission system.

With the above understanding of the basic structure of the base units and each mobile unit to effect downstream diversity, a more detailed explanation of the manner of selecting the transmission and receiver parameters is now presented with respect to block diagram 400 of FIG. 4. Two base units 401 and 403 in this exemplary system 400 shown in FIG. 4 are in contiguous cells in a microcell system. It is presumed that the available bandwidth-baud interval product is large enough so that the transmitted signal space is two-dimensional. However, both the base units emit signals in the same frequency band, so that no additional bandwidth is needed for the overall system.

The $j^{th}$ BU, $j=1,2$ can transmit two different pulse shapes that are selected for their effectiveness in communication in the frequency band of interest. The two shapes are designated $p^{j1}(t)$ and $p^{j2}(t)$; moreover, any linear combination of the two, that is, $\delta_1 p^{j1}(t) + \delta_2 p^{j2}(t)$, is also then effective for the desired communication. For example, with reference to FIG. 4, signal sources 411 and 412 generate $p^{11}(t)$ and $p^{12}(t)$, respectively, with $p^{11}(t)$ serving as one input to multiplier 421 and $p^{12}(t)$ serving as one input to multiplier 422. The other input to multiplier 421 is the signal $a_1 s^{11}$, whereas the other input to multiplier 422 is the signal $a_2 s^{12}$. The signals $a_2 s^{11}$ and $a_2 s^{12}$ are supplied to the respective multipliers by SPC 405, which provides these signals based on the computation described hereinafter in detail. The output from each of the multipliers 421 and 422 serves as an input to summer 431, thereby resulting in the signal $a_1 s^{11} p^{11}(t) + a_2 s^{12} p^{12}(t)$ at the output of summer 431. The output of summer 431 feeds an antenna (for example, antenna 213 of FIG. 2) for propagation of a RF signal. In this formulation, it is said that the $j^{th}$ BU generates the two-dimensional vector $S^j$, which has components $s^{j1}$ and $S^{j2}$. The quantities $a_1$ and $a_2$ are the actual data symbols emanating from the data sources 406 and 407 served by SPC 405; in particular, $a_1$ is data to be transmitted to MU 402, and $a_2$ is data destined to MU 404. The manner in which each $a_i$ is included into the formulation is covered shortly; for the moment, to elucidate terminology, the following assumption is made: $a_i = 1$, that is, the data is a string of 1's.

The $i^{th}$ MU is arranged with two linearly independent front-end filters, namely, $\phi_{i1}(t)$ and $\phi_{i2}(t)$, each of which is followed by a sampler. The outputs of the samplers, $S_{oi1}$ and $S_{oi2}$, respectively, become the components of a two-dimensional vector $S_{oi}(n)$. (The index "n" in $S_{oi}(n)$ indicates the sampled nature of the signal). For example, MU 402 includes front-end filters 461 and 462 having the time-domain filter characteristics $\phi_{11}(t)$ and $\phi_{12}(t)$, respectively, matched to $p^{11}(t)$ and $p^{12}(t)$, respectively. Sampler 471 samples the output of filter 461 to provide sampled output $s_{o11}$, whereas sampler 472 samples the output of filter 462 to provide sampled output $s_{o12}$.

The transmission characteristic of the RF path from BU 401 to MU 402 is presumed to have impulse response $h_1{}^1(t)$, depicted by filter 441. Similarly, filter 442, having impulse response $h_2{}^1(t)$, couples BU 401 to MU 404. In addition, filter 443, having impulse response $h_1{}^2(t)$, couples BU 403 to MU 402. Finally, filter 444, having impulse response $h_2{}^2(t)$ J, couples BU 403 to MU 404. Therefore, the signals received by MU 402 are derived from two sources, namely, the signal propagating over channel 441 from BU 401 and the signal propagating over channel 443 from BU 403. These two signals are superimposed at the input to MU 402; summer 451 models this superposition. (The remaining input to summer 451 is a noise component $N_1$. The manner in which this noise is incorporated into the formulation is covered shortly; for the moment, it is presumed that the additive noise is negligible).

Given the above description, the transmission from the $j^{th}$ BU to the $i^{th}$ MU may be described by the transmission of the two-dimensional vectors $S^j$ governed by the following vector equation:

$$S_{oi}(n) = \sum_{j=1}^{2} C_i^j(n) S^j, \tag{1}$$

where $S_{oi}(n)$ is the sampled sequence composed of the desired or cursor signal $S_{oi}(0)$ as well as the post-cursor signals $S_{oi}(n)$, $n > 0$, at the $i^{th}$ MU's sampler output. In a similar manner, the matrices $C_i^j(n)$ may be considered as a combination of cursor and post-cursor transmission matrices. The elements of $C_i^j(n)$ are given by $$c_{ikm}^j(n) = \int_0^T \int_0^T \phi_{ik}(\beta) h_i^j(nT - \beta - \tau) p^{jm}(\tau) d(\beta) d(\tau), \tag{2}$$

where T is the duration of each $p^{ji}(t)$ (or, equivalently, the sampling rate is 1/T). This expression for $c_{ikm}^j(n)$ obtains, for example, as follows: the output of channel characteristic 441 in response to signal $p^{11}(t)$ is the convolution of $p^{11}(t)$ with impulse response $h_1^1(t)$, whereas the output of front-end filter 461 due to signal $p^{11}(t)$ is the convolution of $\phi_{11}(t)$ with the time signal resulting from convolving $p^{11}(t)$ with $h_1^1(t)$. For instance, if $s_{11}(t)$ is the output of filter 461, then $$s_{11}(t) = s^{11} c_{111}^1(t) + s^{12} c_{112}^1(t) + s^{21} c_{111}^2(t) + s^{22} c_{112}^2(t). \tag{3}$$

(Recall $a_i = 1$ for now.)

The following situation is now considered: it is desired to transmit data to the $i^{th}$ MU by selecting each BU vector $S^j$ so that the interference to the other MU is constrained, while also maximizing the ratio of the received signal energy to the mean-square error at the $i^{th}$ MU. The collection of all such transmissions vectors supplied by the BU's is designated $\{S_i^j\}$. Now, each data source supplies data ($a_i$, $i=1,2$ for the special case) to each transmitter vector so that the transmitted vector for the general case of transmitting actual data may be expressed as $\{a_i S_i^j\}$. Thus, the sequence of output vectors received by the $i^{th}$ MU has the general form:

$$S_{oi}(n) = a_i \sum_{j=1}^{2} C_i^j(n) S_i^j. \tag{4}$$

Furthermore, in general, the signal processed by the $i^{th}$ MU is corrupted by interference and noise, which is represented by a sequence of random vectors $N_i(n)$. For example, if $N_{fi}(t)$ is the noise input to summer 451, then $N_1(n)$ represents the result of sampling $N_{fi}(t)$ by sampler 471 after $N_{fi}(t)$ is filtered by front-end filter 461. Part of the noise is due to signals transmitted by the two BUs that are intended for the other MU. When the additive noise is taken into account, the total two-dimensional signal vector that is received by the $i^{th}$ MU, designated $W_i(n)$, is given by:

$$W_i(n) = a_i \sum_{j=1}^{2} C_i^j(n) S_i^j + N_i(n). \tag{5}$$

At the $i^{th}$ MU, the inner product of a receiver vector, denoted $R_i$, with $W_i(0)$ is formed to produce an estimate, referred to as $a_i$, of the transmitted data. The receiver vector $R_1$, for example, for MU 402 is composed of components $r_{11}$ and $r_{12}$, which are available as inputs to multipliers 481 and 482, respectively. The other inputs to these multipliers are $s_{o11}$ and $s_{o12}$, respectively, that is, the output of filters 461 and 462 after sampling. Thus, the estimate of the transmitted data that is performed by the $i^{th}$ MU may be expressed as:

$$\hat{a}_i = a_i (R_i, S_{oi}(0)) + (R_i, W_i), \tag{6}$$

where (U,V) is the notation for the inner product between U and V. In this context, an inner product is defined as follows: if U has components $u_{11}$ and $u_{12}$ and V has components $v_{11}$ and $v_{12}$, then the inner product $(U,V) = u_{11}v_{11} = u_{12}v_{12}$.

The circuitry of SPC 405 coupled to base units 401 and 403 is arranged to select the vector $R_1$ and the set of vectors transmitted by the two BUs, $S_1^1$ and $S_2^2$, so that the ratio of the signal energy to mean-square error (designated the signal-to-interference ratio or SIR) in $a_1$ is maximized. (Once $R_1$ is selected, it must of course be transmitted to the MU 402; this procedure will be discussed later). In making this ratio as large as possible, it is necessary to take into account the effect of interference received by the second mobile unit 404 as a result of the transmission from the base units 401 and 403. This interference, which is a component of $N_2(0)$, is given by:

$$I_{21} = a_1 \left( R_2, \sum_{j=1}^{2} C_2^j S_1^j \right). \tag{7}$$

Thus, the overall maximization problem becomes one of maximizing $a_i$ subject to a constraint on a linear combination of the mean-square value of this interference and the transmitted power from base unit 401, that is, $S_1^j$ and $R_1$ are selected to maximize the SIR at the output of the mobile unit 402, namely, the output of summer 491. The transmitted power is included in this combination as a means of controlling interference into any contiguous cells. Thus, it is required that the combination of power and mean-square interference to mobile unit 404 is $P<a^2>$ while optimizing the performance of mobile unit 402, where P is the nominal power output of a BU and $<a^2>$ is the average power of the transmitted data. Thus the optimization problem may be couched as one of maximizing the SIR, designated $\lambda$, as follows:

$$\lambda = \frac{<a^2> \alpha^2 + \mu <a^2> \left( P - d_1 \left( \sum_{j=1}^{2} (S_1^j, S_1^j) \right) - d_2 \left( R_2, \sum_{j=1}^{2} C_2^j S_1^j \right)^2 \right)}{<a^2>(\alpha - 1)^2 + <(R_1, N_1(0))^2>}, \tag{8}$$

where $d_1$ and $d_2$ are constants that are chosen from engineering considerations to give differential weight to the interference at MU 404. In equation 8, $\alpha$ is as follows:

$$\alpha = \left( R_1, \sum_{j=1}^{2} C_1^j S_1^j \right), \quad (9)$$

so that $<a^2>\alpha^2$ is the mean-square received signal power. The deviation of $\alpha$ from the value of 1.0 measures the distortion in the transmitted data. If the linear combination of the transmitted power and interference detected by MU 404 is $P<a^2>$, then equation 8 gives the SIR for MU 402; the parameter $\mu$ is chosen to insure this condition is satisfied. (Thus, the parameter $\mu$ acts as a Lagrange multiplier).

In order to simplify the presentation that follows, certain observations are now made. First, the quantities associated with $d_1$ and $d_2$ in the numerator of equation 8 are expressible as a quadratic form, so the matrices $A_{jk}$ may be defined by $$(S_1^j, A_{jk} S_1^k) = d_1 (S_1^j, S_1^k) \delta_{jk} + d_2 (R_2, C_2^j S_1^j)(R_2, C_2^k S_1^k), \quad (10)$$

where $\delta_{jk}$ is a kronecker delta and the matrices $A_{jk}$ are symmetric. Secondly, it is observed that the noise and interference at MU 402 is also a quadratic form in that the receiver vector may be written as $$<(R_1, N_1(0))^2> = <a^2>(R_1, N_1 R_1), \quad (11)$$

which equation defines the normalized covariance matrix $N_1$ of the noise and interference at MU 402. The normalization was so chosen to simplify the resulting form of the equation for the SIR. Using the relations for $A_{jk}$ and $N_1$ in equation 8 yields:

$$\lambda = \frac{a^2 + \mu \left( P - \sum_{k=1}^{2} \sum_{j=1}^{2} (S_1^j, A_{jk} S_1^k) \right)}{(\alpha - 1)^2 + (R_1, N_1, R_1)}. \quad (12)$$

The task is now to maximize $\lambda$ by appropriate choice of $R_1$ and $S_1^j$.

To find the optimum solution, $S_1^j$ in equation 12 is varied in the sense of the calculus of variations while keeping $R_1$ fixed, to obtain:

$$[\alpha - \lambda(\alpha - 1)] C_1^* R_1 - \mu \sum_{k=1}^{2} A_{kj} S_1^k = 0, \quad (13)$$

where the superscript * indicates the transpose of the vector or matrix. Next, $R_1$ is varied in equation 8 while keeping $S_1^j$ fixed, to obtain:

$$[\alpha - \lambda(\alpha - 1)] \sum_{k=1}^{2} C_1^k S_1^k - \lambda N_1 R_1 = 0. \quad (14)$$

From equations 13 and 14, it is possible to determine the following expression involving $\alpha$:

$$\lambda(\alpha - 1) = 0 \quad (15)$$

Equation 15 has two solutions, namely, $\lambda = 0$ (which is the minimum SIR), and $\alpha = 1$. This latter solution indicates that distortionless transmission is optimal. Using this result for $\alpha$ in equations 13 and 14 leads to:

$$C_1^* R_1 - \mu \sum_{k=1}^{2} A_{kj} S_1^k = 0, \quad (16)$$

and $$\sum_{k=1}^{2} C_1^k S_1^k - \lambda N_1 R_1 = 0. \quad (17)$$

It is now possible to determine $\mu$ at this point from equation 16 by taking the inner product with $S_1^j$ and summing over the index j to obtain $\mu = 1/P$, where the definition of $\alpha$, the fact that $\alpha = 1$ and the constraint that defines P, as below, have been utilized:

$$P = d_1 \sum_{j=1}^{2} (S_1^j, S_1^j) + d_2 \left( R_2, \sum_{j=1}^{2} C_2^j S_1^j \right)^2. \quad (18)$$

Without loss of generality and for simplicity of notation, it is now assumed that $P = 1$ from this point forward. Equation 16 then becomes $$C_1^* R_1 - \sum_{k=1}^{2} A_{kj} S_1^k = 0. \quad (19)$$

Writing equations 16 and 19 in block matrix form provides insight into the procedure to solve these equations:

$$[C_1^1 C_1^2] \begin{bmatrix} S_1^1 \\ S_1^2 \end{bmatrix} - \lambda N_1 R_1 = 0, \quad (20)$$

and $$\begin{bmatrix} C_1^{1*} \\ C_1^{2*} \end{bmatrix} R_1 - \begin{bmatrix} A_{11} & A_{12} \\ A_{21} & A_{22} \end{bmatrix} \begin{bmatrix} S_1^1 \\ S_1^2 \end{bmatrix} = 0. \quad (21)$$

These latter two equations are now converted into an eigenvalue problem. First, equation 20 is solved for $R_1$ to yield:

$$R_1 = \frac{1}{\lambda} N_1^{-1} [C_1^1 C_1^2] \begin{bmatrix} S_1^1 \\ S_1^2 \end{bmatrix} \quad (22)$$

Using this result in equation 21 then leads to the following four-dimensional eigenvalue problem for the optimum signal vector pair:

$$\begin{bmatrix} C_1^{1*} \\ C_1^{2*} \end{bmatrix} N_1^{-1} [C_1^1 C_1^2] \begin{bmatrix} S_1^1 \\ S_1^2 \end{bmatrix} = \lambda \begin{bmatrix} A_{11} & A_{21} \\ A_{21} & A_{22} \end{bmatrix} \begin{bmatrix} S_1^1 \\ S_1^2 \end{bmatrix} \quad (23)$$

Although this is a four-dimensional eigenvalue problem, only two of the eigenvalues will be different from zero. This is true because the operator $[C_1^1 C_1^2]$ on the left of equation 23 has only a two-dimensional range.

Figure 5:
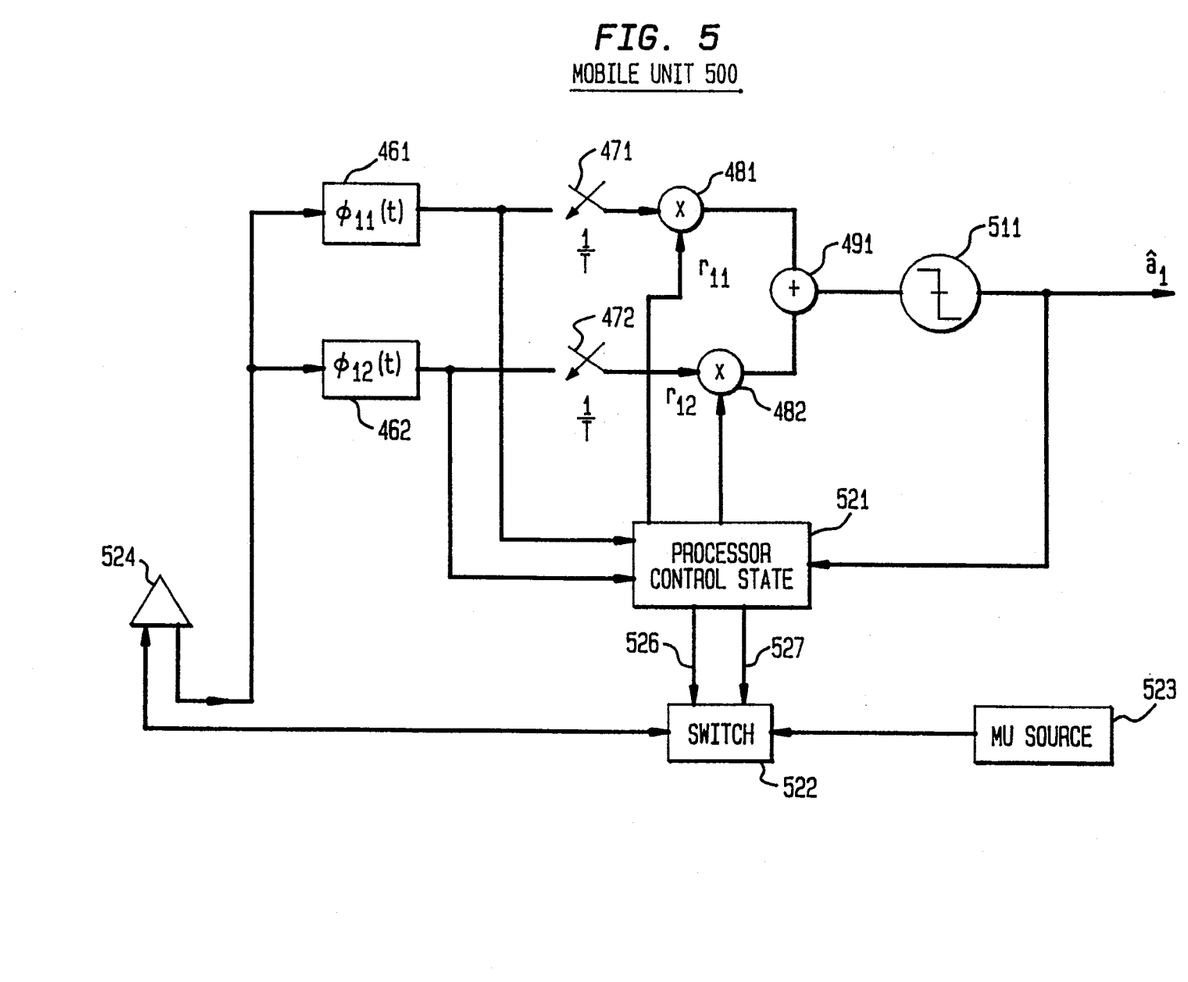
FIG. 5 is a general block diagram of a mobile unit depicting both upstream and downstream signal transmission paths.

The block diagram of FIG. 5 depicts illustrative circuitry 500 for either MU 402 or MU 404 since the mobile units are substantially the same; in the following discussion, the focus is on MU 402, and elements common to FIGS. 4 and 5 use the same reference numerals. Circuitry 500 is shown as being composed of front-end filters 461 and 462 which receive the same input as detected by antenna 524. Samplers 471 and 472 sample the output of filters 461 and 462, respectively. The output of sampler 471 serves as one input to multiplier 481; the other input to multiplier is the $r_{11}$ component of the receiver vector $R_1$, and this component is provided by processor 521. The output of multiplier 481 serves as one input to summer 491. The output of sampler 472 serves as one input to multiplier 482; the other input to multiplier is the $r_{12}$ component of the receiver vector $R_1$, and this component is provided by processor 521. The output of multiplier 481 serves as another input to summer 491. The output of summer 491 serves as the input to slicer 511. The output of slicer 511 provides the estimate $a_1$. Slicer 511 provides either: a "1" output if the level into slicer 511 is greater than a predetermined threshold (e.g. 0.5 on a normalized basis); or provides a "0" otherwise. In processor 521, the differences between the outputs of filters 461 and 462 and the output of slicer 511 provides estimates to the noise components in the direction of the input space basis vectors represented by filters 461 and 462, respectively. Processor 521 stores the estimates to the noise components for a sufficiently long time to generate an estimate to the covariance matrix of the noise vectors. These covariance matrix estimates are periodically transmitted back to the base units and, in turn, to SPC 405 for tracking and processing. This is accomplished by switching switch 522, under control of the CONTROL port of processor 521, to provide the state information pertaining to processor 521 via the STATE port, to antenna 524 for upstream propagation to the base stations and, in turn, to SPC 405. The other operating mode of switch 522 is to connect receiver data source 523 through to antenna 524 for propagation of data in the upstream direction.

The base stations periodically transmit impulses so that the mobile units served by these base stations can measure the impulse responses through the intervening RF path. These impulse responses need only be measured at the output of filters 461 and 462, respectively (refer to the expression for $c_{ikm}{}^j$ in equation 2.) The impulse responses are also transmitted back to the base stations and, in turn, to SPC 405 for tracking and processing purposes. SPC 405 thus has all the information necessary to solve for the eigenvalues and eigenvectors of equations 22 and 23. The information relating to each $S_j{}^j$ is then utilized in the base units for downstream transmission, and the appropriate receiver vector $R_i$ is transmitted to the corresponding mobile unit to effect inner product detection in the mobile units.

The solution provided by equations 22 and 23 controls only the cursor interference in MU 404. Post-cursor interference at either MU has not been considered in the above formulation. To eliminate post-cursor interference at MU 404, it is first noted that an optimum transmitted signal vector-receiver vector pair can be obtained for MU 404 in the same way the solution was generated for MU 402. Every time a signal is transmitted for MU 402, SPC 405 can also provide a signal that can be transmitted that is optimum for MU 404 which will cancel the post-cursor interference from the initial transmission to MU 402. Of course, each of these transmissions will also generate post-cursors, but a series of transmissions can be continuously generated within SPC 405 that will lead to no net post-cursor interference at MU 404.

Thus, the cursor interference to MU 404 has been controlled, and the post-cursor interference has been eliminated. What is left untreated to this point is post-cursor interference at MU 402. This interference is due to post-cursor interference from the initial transmission to MU 402 and to interference from the signals transmitted to eliminate post-cursor interference at MU 404. This interference can be eliminated by a decision feedback equalizer at MU 402 because the total pattern of post-cursors due to both causes is constant in a time-invariant channel, and will vary slowly enough in radio channels to permit acceptable tracking.

ADAPTATION PROCEDURE

In this section a description of how the mobile units and the base units adapt for the two antenna system is presented in detail. The generalization to more than two base units and mobile units is straightforward. Assume that mobile unit 404 is already operating in an area served by two base units and that unit 404 has adapted to optimal settings in the absence of mobile unit 402. SPC 405 thus has already computed and transmitted the settings for the receiver vector $R_2$ of mobile unit 404 and the impulse responses from the two base stations at mobile unit 404. It is assumed that the two base stations periodically transmit impulses so that mobile units can update their estimates of impulse responses and transmit the estimates back to SPC 405. It is also assumed that there is a control channel that is separate from the communications channels. Mobile unit 402 announces its arrival on the upstream part of this channel. SPC 405 then selects the PAM signals that mobile unit 402 will use and SPC 405 transmit signals on the control channel that make initial receiver $R_1$ vector settings and $\phi_{11}(t)$ and $\phi_{12}(t)$ selections in mobile unit 402. Then the following procedure is initiated:

1. Mobile unit 402 receives impulse responses from the two base units which are assumed to be generated periodically and alternately by the two base stations. The best estimate of the impulse responses is returned to SPC 405 which uses the information to adapt mobile unit 402's receiver vector. In these initial transmissions to mobile unit 402, the base stations use signal vectors that will cause minimal interference with signals intended for mobile unit 404. Such signals can be designed in accordance with the foregoing eigenvalue procedure i.e., equation 23. In using this procedure for this purpose, it should be assumed that there is no noise at the input to either mobile receiver. This can be done because the SPC 405 knows the impulse responses ($\phi_i(t)$) of the front end filters of the mobile units and the transmitted signal shapes $p^{jn}(t)$) and has received the transmission impulse responses that were transmitted by mobile unit 402, so that elements of the transmission matrices ($C_i{}^j$) can be determined using equation 2.

2. The transmissions back to the base stations also give SPC 405 information on the upstream impulses from Mobile Unit 402 on which to base adaptation of mobile unit 402's upstream transmitter in accordance with the procedure described in the Lechleider paper.

3. Mobile unit 402 also senses the interference and noise estimates the second-order properties of these effects by standard procedures for such estimates, using the processor, and then transmits the estimates back to SPC 405. This information is used in the eigenvalue and eigenvector computations.

4. SPC 405 solves the eigenvalue problems presented above by equations 22 and 23. SPC 405 then uses this information to adjust the base station transmission parameters and mobile unit 402's $R_1$ vector.

5. As a result of bringing mobile unit 402 on-line, the environment is changing for mobile unit 404. SPC 405 continues to track the environment of mobile unit 404 and to adapt both the base stations and mobile unit 404's $R_2$.

GENERALIZATION

Whereas the above formulation has been developed explicitly for two base units and two mobile units, the generalization to a more complex yet real-world environment is readily accomplished. Basically, four classes of quantities are variable, namely: (1) the generator transmission signals represented by $p^{jk}(t)$, and concomitantly, the quantities $S^j_i$; (2) the filters represented by $\phi_{ik}(t)$, and concomitantly, the quantities $R_i$; (3) the number of base units; and (4) the number of mobile units. Thus, for example, another possible arrangement would be to coordinate the transmission of $a_1$ to the first mobile unit using three base units. Then data $a_1$ would serve as an input to the three base units, and would weight three different transmission signals (say, $s^{11}p^{11}(t)$, $s^{21}p^{21}(t)$, and $s^{31}p^{31}(t)$). The mobile unit assigned to detect data $a_1$ would then be arranged with three front-end filters, followed by three samplers, and each sampled output would be weighted by a corresponding one of the $R_1$ components, which is this case would be $r_{11}$, $r_{12}$, and $r_{13}$. On the other hand, data $a_2$ may still only be transmitted by two base units, so $a_2$ would still only weight two different transmission signals as in FIG. 4.

It is to be understood that the above-identified arrangements and embodiments are simply illustrative of the application of the principles in accordance with the present invention. Other arrangements may be readily devised by those of ordinary skill in the art which embody the principles of the present invention and fall within its spirit and scope.

What is claimed is:

1. A method for transmitting a data symbol to a given mobile unit utilizing a plurality of base units, each base unit arranged to generate a transmission signal effective for radio frequency propagation, the method comprising the steps of
   weighting the data symbol with adaptive transmission parameters to produce a weighted symbol for each base unit,
   weighting the transmission signal for each base unit with the corresponding weighted symbol to produce a weighted transmission signal,
   propagating each weighted transmission signal from its corresponding base unit,
   detecting a composite transmission signal at the given mobile unit, the composite signal formed as the superposition of each weighted transmission signal propagated by each base unit, and
   processing the composite signal with adaptive receiver parameters to produce an estimate of the data symbol, wherein the number of adaptive receiver parameters corresponds to the number of adaptive transmission parameters,
   said adaptive transmission parameters and said adaptive receiver parameters being determined by solving an eigenvalue relation so as to optimize the estimate of the data symbol in the given mobile unit while constraining the power output from the base units as well as accounting for interference to other mobile units within the propagation range of the base units due to each weighted transmission signal.

2. The method as recited in claim 1 wherein said step of processing includes the steps of
   feeding the composite signal into a plurality of filters to produce a set of filtered signals, each of the filters being matched to each corresponding transmission signal generated by each base unit,
   sampling each of the filtered signals to produce a set of sampled signals,
   weighting each of the sampled signals with a corresponding one of the receiver parameters to produce weighted sampled signals, and
   summing the weighted sampled signals to provide a weighted sum representative of the data symbol.

3. The method as recited in claim 2 further including the step of slicing the weighted sum to provide the estimate of the data symbol.

4. The method as recited in claim 1 wherein said step of processing includes the steps of
   feeding the composite signal into a plurality of filters to produce a set of filtered signals, each of the filters being matched to each corresponding transmission signal generated by each base unit,
   sampling each of the filtered signals to produce a set of sampled signals,
   weighting each of the sampled signals with a corresponding one of the receiver parameters to produce weighted sampled signals,
   summing the weighted sampled signals to provide a weighted sum representative of the data symbol, and
   slicing the weighted sum to provide the estimate of the data symbol.

5. The method as recited in claim 4 wherein there are two base units (j=1,2) and two mobile units (i=1,2) with the given mobile unit being the first mobile unit, and wherein the adaptive transmission parameters are components of a vector set given by $\{S_i^j\}$, and the adaptive receiver parameters are components of a receiver vector given by $R_1$, these parameters being determined by solving the following eigenvalue relations:

$$R_1 = \frac{1}{\lambda} N_1^{-1} [C_1^1 C_1^2] \begin{bmatrix} S_1^1 \\ S_1^2 \end{bmatrix},$$

and $$\begin{bmatrix} C_1^{1*} \\ C_1^{2*} \end{bmatrix} N_1^{-1} [C_1^1 C_1^2] \begin{bmatrix} S_1^1 \\ S_1^2 \end{bmatrix} = \lambda \begin{bmatrix} A_{11} & A_{21} \\ A_{21} & A_{22} \end{bmatrix} \begin{bmatrix} S_1^1 \\ S_1^2 \end{bmatrix},$$

where each $C_1^j$ is the propagation path characteristic from the $j^{th}$ base unit to the first mobile unit including the transmission signal of the $j^{th}$ base unit and the corresponding filter characteristics of the first mobile unit, $N_1$ is a noise covariance matrix as detected in the first mobile unit, $\lambda$ represents the eigenvalues, and A is a block matrix defined by equation (10).

6. The method as recited in claim 5 further comprising the step of determining the differences between the output of each of the filters and the estimate of the data symbol, said differences being representative of the noise covariance matrix.

7. A method for transmitting a first data symbol to a first mobile unit among a multiplicity of mobile units utilizing a plurality of base units, each base unit arranged to generate at least a first transmission signals effective for radio frequency propagation, the method comprising the steps of
   weighting the first data symbol with first adaptive transmission parameters to produce a weighted first symbol for each base unit,
   weighting the first transmission signal for each base unit with the corresponding weighted first symbol to produce a weighted first transmission signal,
   propagating each weighted first transmission signal from its corresponding base unit,
   detecting a composite transmission signal at the first mobile unit, the composite signal formed as the superposition of each weighted first transmission signal propagated by each base unit, and
   processing the composite signal with adaptive receiver parameters to produce an estimate of the first data symbol, wherein the number of adaptive receiver parameters corresponds to the number of first adaptive transmission parameters,
   said first adaptive transmission parameters and said adaptive receiver parameters being determined by solving an eigenvalue relation so as to optimize the estimate of the first data symbol in the first mobile unit while constraining the power output from the base units as well as accounting for interference to the remaining mobile units due to each weighted first transmission signal.

8. The method as recited in claim 7 wherein said step of processing includes the steps of
   feeding the composite signal into a plurality of filters to produce a set of filtered signals, each of the filters being matched to each corresponding transmission signal generated by each base unit,
   sampling each of the filtered signals to produce a set of sampled signals,
   weighting each of the sampled signals with a corresponding one of the receiver parameters to produce weighted sampled signals, and
   summing the weighted sampled signals to provide a weighted sum representative of the first data symbol.

9. The method as recited in claim 8 further including the step of slicing the weighted sum to provide the estimate of the data symbol.

10. The method as recited in claim 7 wherein said step of processing includes the steps of
    feeding the composite signal into a plurality of filters to produce a set of filtered signals, each of the filters being matched to each corresponding transmission signal generated by each base unit,
    sampling each of the filtered signals to produce a set of sampled signals,
    weighting each of the sampled signals with a corresponding one of the receiver parameters to produce weighted sampled signals,
    summing the weighted sampled signals to provide a weighted sum representative of the first data symbol, and
    slicing the weighted sum to provide the estimate of the first data symbol.

11. The method as recited in claim 10 wherein there are two base units (j=1,2) and two mobile units (i=1,2), and wherein the adaptive transmission parameters are components of a vector set given by $\{S_i^j\}$, and the adaptive receiver parameters are components of a receiver vector given by $R_1$, these parameters being determined by solving the following eigenvalue relations:

$$R_1 = \frac{1}{\lambda} N_1^{-1} [C_1^1 C_1^2] \begin{bmatrix} S_1^1 \\ S_1^2 \end{bmatrix},$$

and $$\begin{bmatrix} C_1^{1*} \\ C_1^{2*} \end{bmatrix} N_1^{-1} [C_1^1 C_1^2] \begin{bmatrix} S_1^1 \\ S_1^2 \end{bmatrix} = \lambda \begin{bmatrix} A_{11} & A_{21} \\ A_{21} & A_{22} \end{bmatrix} \begin{bmatrix} S_1^1 \\ S_1^2 \end{bmatrix},$$

where each $C_i^j$ is the propagation path characteristic from the $j^{th}$ base unit to the first mobile unit including the transmission signal of the $j^{th}$ base unit and the corresponding filter characteristics of the first mobile unit, $N_1$ is a noise covariance matrix as detected in the first mobile unit, $\lambda$ represents the eigenvalues, and A is a block matrix defined by equation (10).

12. The method as recited in claim 11 further comprising the step of determining the differences between the output of each of the filters and the estimate of the data symbol, said differences being representative of the noise covariance matrix.

13. Circuitry for transmitting a data symbol generated by a data source, the circuitry comprising
    a plurality of base units, each base unit arranged to generate a transmission signal effective for radio frequency propagation,
    a plurality of mobile units, including a given mobile unit,
    means, coupled to the base units, for weighting the data symbol with adaptive transmission parameters to produce a weighted symbol for each of the base units,
    means, coupled to the base units, for weighting the transmission signal for each of the base units with the corresponding weighted symbol to produce a weighted transmission signal,
    means, coupled to the base units, for propagating each weighted transmission signal from its corresponding one of the base units, and
    said given mobile unit including
       means for detecting a composite transmission signal at the mobile unit, the composite signal formed as the superposition of each weighted transmission signal propagated by each of the base units, and
       means, coupled to the means for detecting, for processing the composite signal with adaptive receiver parameters to produce an estimate of the data symbol, wherein the number of adaptive receiver parameters corresponds to the number of adaptive transmission parameters,
       said adaptive transmission parameters and said adaptive receiver parameters being determined by solving an eigenvalue relation so as to optimize the estimate of the data symbol in said given mobile unit while constraining the power output from the base units as well as accounting for interference to the other mobile units within the propagation range of the base units due to each weighted transmission signal.

* * * * *